United States Patent [19]
Kitamura

[11] Patent Number: 5,426,711
[45] Date of Patent: Jun. 20, 1995

[54] ONLINE HANDWRITTEN CHARACTER RECOGNITION

[75] Inventor: Kozo Kitamura, Kawasaki, Japan

[73] Assignee: International Business Machines Corporation, Armonk, N.Y.

[21] Appl. No.: 957,334

[22] Filed: Oct. 6, 1992

[30] Foreign Application Priority Data

Dec. 11, 1991 [JP] Japan .................................. 3-327680

[51] Int. Cl.⁶ .............................................. G06K 9/00
[52] U.S. Cl. ..................................... 382/187; 382/218
[58] Field of Search ................... 382/3, 13, 16, 24, 36, 382/38, 49, 30, 34

[56] References Cited

U.S. PATENT DOCUMENTS

| | | | |
|---|---|---|---|
| 3,593,287 | 7/1977 | Kobayashi et al. | 382/24 |
| 3,833,882 | 9/1974 | Busby | 382/24 |
| 4,561,105 | 12/1985 | Crane et al. | 382/13 |
| 4,607,386 | 8/1986 | Morita et al. | 382/13 |
| 4,972,496 | 11/1990 | Sklarew | 382/13 |

FOREIGN PATENT DOCUMENTS 57-132283 3/1982 Japan .
60-089289 11/1985 Japan .
63-129948 2/1988 Japan .

OTHER PUBLICATIONS

Sakuraba, Y., et al. "Online Handwritten Character Recognition Using Fuzzy Set Theory." *The Transactions of the Institute of Electronics, Information and Communication Engineers*, vol. J72-D-II, No. 12, pp. 2032-2040.

Tamori, H., et al. "A Method of Online Handwritten Character Recognition by Fuzzy Inference." *The Transactions of the Institute of Electronics, Information and Communication Engineers*, vol. J74-D-II, No. 2, pp. 166-174.

*Primary Examiner*—Joseph Mancuso
*Attorney, Agent, or Firm*—Jack M. Arnold; Robert P. Tassinari, Jr

[57] ABSTRACT

An online handwritten character recognition system which performs the narrowing of candidates for handwritten character recognition quickly and very accurately by simple processing of a small amount of operations. A predetermined characteristic amount is extracted for each stroke, a characteristic amount word is created having a binary value of 1 only in one or more bit positions corresponding to selected values of the characteristic amount, an AND operation is performed bit-by-bit between the reference word of the corresponding stroke of the character of interest, and it is determined if all the bits of the results of the AND operation are zero. If the number of binary values of the results of the zero-determining operation for all the strokes of the character of interest exceeds a threshold, it is judged to be a candidate.

5 Claims, 4 Drawing Sheets

NORMALIZATION OF
INPUT CHARACTER DATA

| 0 | 4 |
|---|---|
| 1 | 5 |
| 2 | 6 |
| 3 | 7 |

| 8  | 11 | 14 |
|----|----|----|
| 9  | 12 | 15 |
| 10 | 13 | 8  |

QUANTIZATION AREAS FOR CENTER
OF GRAVITY OF A STROKE

| 0 | 4 |
|---|---|
| 1 | 5 |
| 2 | 6 |
| 3 | 7 |

| 8  | 11 | 14 |
|----|----|----|
| 9  | 12 | 15 |
| 10 | 13 | 8  |

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 0 | 0 | 0 | 0 | 0 | 1 | 0 | 0 | 0 | 0 | 0  | 0  | 1  | 0  | 0  | 0  |

EXPRESSION OF THE CHARACTERISTIC AMOUNT
OF CENTER OF GRAVITY OF A STROKE

THE SECOND STROKE OF THE CHARACTER "大"

FIG. 5

SAMPLE

| 0 | 0 | 0 | 0 | 0 | 1 | 0 | 0 | 0 | 0 | 0 | 0 | 1 | 0 | 0 | 0 |

| 0 | 0 | 0 | 0 | 0 | 0 | 1 | 0 | 0 | 0 | 0 | 1 | 0 | 0 | 0 | 0 |

| 0 | 0 | 1 | 0 | 0 | 0 | 0 | 0 | 0 | 0 | 0 | 1 | 0 | 0 | 0 | 0 |

↓ OR OPERATION

DICTIONARY CHARACTER

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 0 | 0 | 1 | 0 | 0 | 1 | 1 | 0 | 0 | 0 | 0  | 0  | 1  | 0  | 0  | 0  |

CREATION OF DICTIONARY CHARACTERS
THE SECOND STROKE OF THE CHARACTER "大"

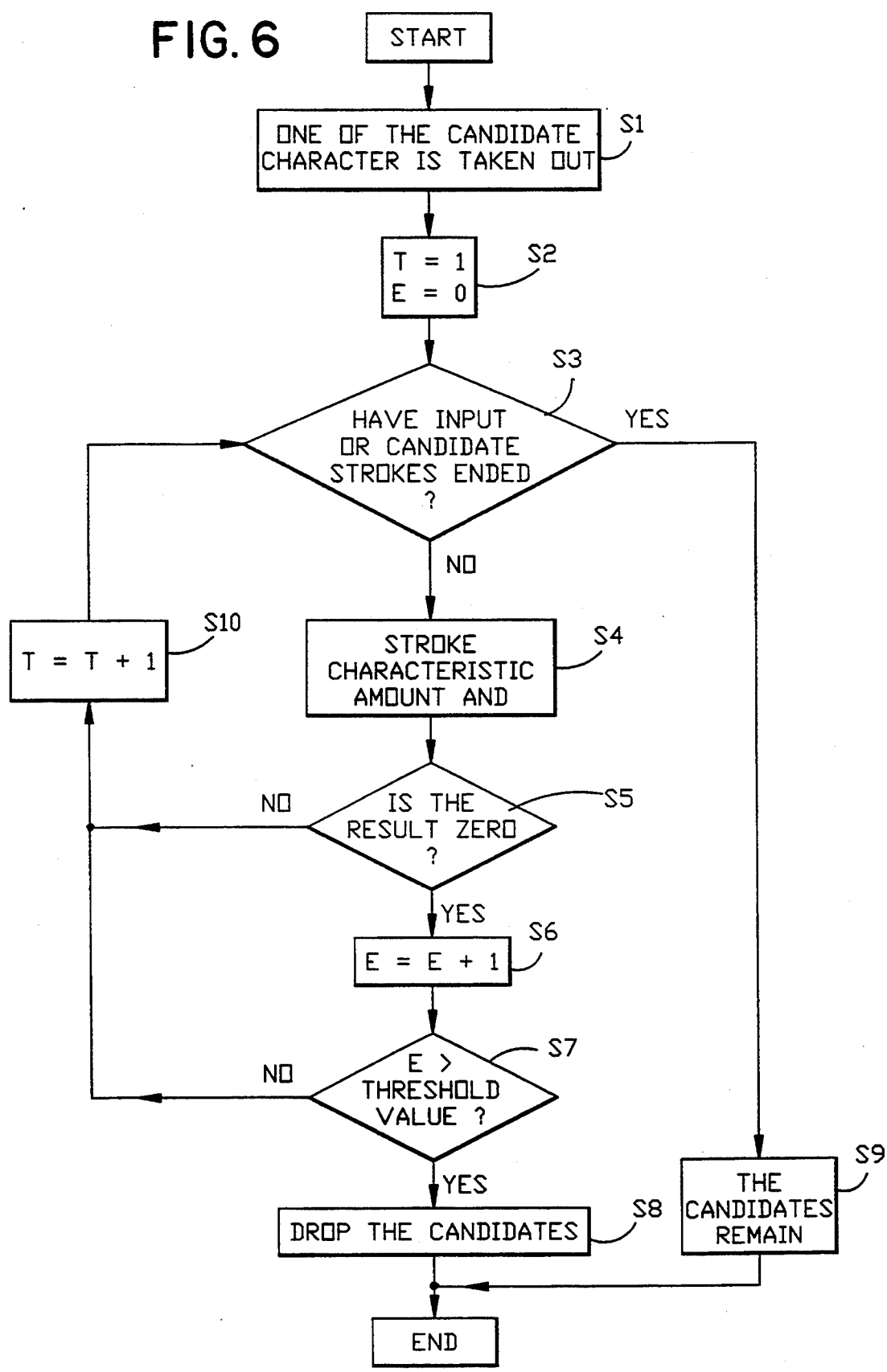

ONLINE HANDWRITTEN CHARACTER RECOGNITION

FIELD OF THE INVENTION

This invention is related to an online handwritten character recognition system and method for recognizing handwritten characters based on locus information which is electronically input through a tablet or the like, and particularly to a system and method which enable high-speed, high-precision and stable restriction of candidate characters by simple processing of a small amount of operations.

BACKGROUND OF THE INVENTION

In online handwritten character recognition, it is effective to narrow down the candidate characters as a form of preprocessing. This is important in order to allow a character type having many categories, such as kanji, to be recognized in real time, particularly in putting a recognition technique into practical use.

Usually, such restriction of candidate characters is first performed using the number of strokes. For instance, candidate characters are narrowed down to the range Number of Strokes K (K is determined according to the number of input strokes or the like). However, with the number of strokes only, it is difficult to obtain a high restriction rate with high precision. To obtain further restriction in addition to restriction by the number of strokes, a complicated procedure has been required for extracting the characteristic amount of a handwritten character, and a great deal of manpower has been needed to prepare a dictionary. For instance, in Sakuraniwa, Y., Yamaguchi, H. and Magome, Y., "Online Handwritten Character Recognition Using Fuzzy Set Theory," Electronic Information Communication Society Articles (D), Vol. J72-D-II, No. 12, pp. 2032–2040, December 1989, the intersection and curved point numbers of strokes are used as characteristic amounts, but extraction of these requires a series of complex procedures such as linear approximation by DP matching, intersection detection by multiplication and division, and stroke order reconstruction. In addition, since the maximum or minimum value of a characteristic amount is used, a slight amount of noise or incorrect characters contained in the handwritten character samples used to extract them can adversely affect the extracted value. In consequence, a great deal of manpower is required to carefully remove noise and incorrect characters. Furthermore, since in principle it is required that the number of strokes must be correctly written, the application range is limited.

There are methods which make the recognition technique itself fast through simplification and use it to narrow down the candidate characters, as shown in the following examples. In Hirose, H., Tasaka, S. Morita, T., Horii, M. and Ida, T., "Online Handwritten Kanji Recognition System," Sharp Technique 1984, No 28, pp. 69–74, the candidate characters are narrowed down through simplification by the performance of a pattern matching method that absorbs stroke order variation only at the starting point of a stroke. In addition, in Wakahara, T. and Umeda, M., "Online Classification of Characters Written in Cursive Style Using Stroke Connection Rule," Articles of Institute of Electronics and Communication Engineers of Japan (D), Vol. J67-D, No. 11, pp. 1285–1292, November 1954, the candidate characters are narrowed down through simplification by the performance of a selective stroke connection method that absorbs variation in the number of strokes and stroke order only at the starting and ending points of a stroke. To absorb variation in stroke order, however, both need to match the strokes of the handwritten characters and the dictionary characters with each other for all combinations. This indicates that an amount of operations proportional to the product of both numbers of strokes is necessary, and thus these are methods which basically require a large amount of operations.

As patent references in the field of this invention, there are Published Unexamined Patent Application Nos. 57-132283, 60-89289 and 63-129488. PUPA No. 57-132283 discloses an approach in which distance is calculated for each stroke in online handwritten character recognition and recognition is performed according to the sum of the distances. However, there is no description of folding the characteristic amounts of a plurality of sample strokes into one word. In addition, the PUPA No. 60-89289 employs an approach similar to the PUPA No. 57-132283. However, this also has no description of folding the characteristic amounts of a plurality of sample strokes into one word. PUPA No. 63-129488 discloses that plural types of reference characteristic amounts are stored for each character, and they are interpolated and used as characteristic amounts for comparison. But, this also has no description of folding the characteristic amounts of a plurality of sample strokes into one word and performing candidate restriction by simple operations of AND and OR.

OBJECT OF THE INVENTION

An object of this invention is to provide a system which narrows down the candidate characters quickly, very accurately and stably for handwritten characters including various character types and variation in number of strokes and stroke order, by means of simple processing with a small amount of operations.

It is a further object of this invention to provide a system which can automatically create a dictionary for the narrowing process from collected handwritten character samples.

DISCLOSURE OF THE INVENTION

In this invention, to accomplish the above objects, if the characteristic amount of an input handwritten character does not correspond to the characteristic amounts of all the handwritten character samples collected for a predetermined character, the candidate characters are narrowed down by judging that the particular character has less probability and dropping it from the candidates. As the characteristic amount, any amount related to strokes such as center of gravity, direction, circumscribed rectangle and number of strokes can be used singly or in combination.

Particularly, handwritten character samples that include variation in number of strokes and stroke order are gathered, and the stroke characteristic amount of each sample is expressed by bits in one word per stroke. This word has one of the possibilities for a binary value set in one or more bit positions corresponding to the characteristic amount which is represents. Then, the words with the same order of strokes are collected for each character category, and the words are gathered into one word by an OR (logical add) operation. The dictionary has entries of one or more character categories for each character (if the handwritten character of a predetermined character can be divided into a plurality of classes, it is effective to prepare character categories for each class), and holds words for each stroke of a character category.

Since the words of the strokes of a character sample are ORed for the same character category and same stroke order and reflected in the words in the dictionary, information about the characteristic amount of a sample character is not lacking. In addition, the number of strokes of a character category in the dictionary matches the maximum value in the samples. The narrowing process is performed on a stroke basis by matching the characteristic amounts of an input handwritten character and dictionary character category. That is, an AND (logical product) operation is performed between the word for the characteristic amount of each stroke of an input handwritten character and the word for the characteristic amount of the corresponding stroke of each dictionary character category. And, a character category for which the result of the AND operation becomes zero for more than a certain number of strokes is judged to be less probable and dropped from the candidates. The candidate characters are narrowed down in this way.

Thus, the characteristic amounts of an input handwritten character and the characteristic amounts of all the collected handwritten character samples can be compared by the same number of AND operations as the number of strokes for one character category, so that stable comparison can be made with a very small amount of operations. At this time, the rate of restriction for the candidates is high for kanji, which require a particularly high rate, and the error rate is low for kanji, hiragana, katakana and alphanumeric. Moreover, the dictionary can be obtained by ORing the stroke characteristic amounts of handwritten character samples, and can be automatically created without requiring human intervention.

BRIEF DESCRIPTION OF THE DRAWINGS

FIG. 5 is a diagram showing creation of a dictionary character used for the character dictionary means of FIG. 1.

FIG. 6 is a flowchart for judgement of candidates.

DETAILED DESCRIPTION OF THE INVENTION

Figure 1:
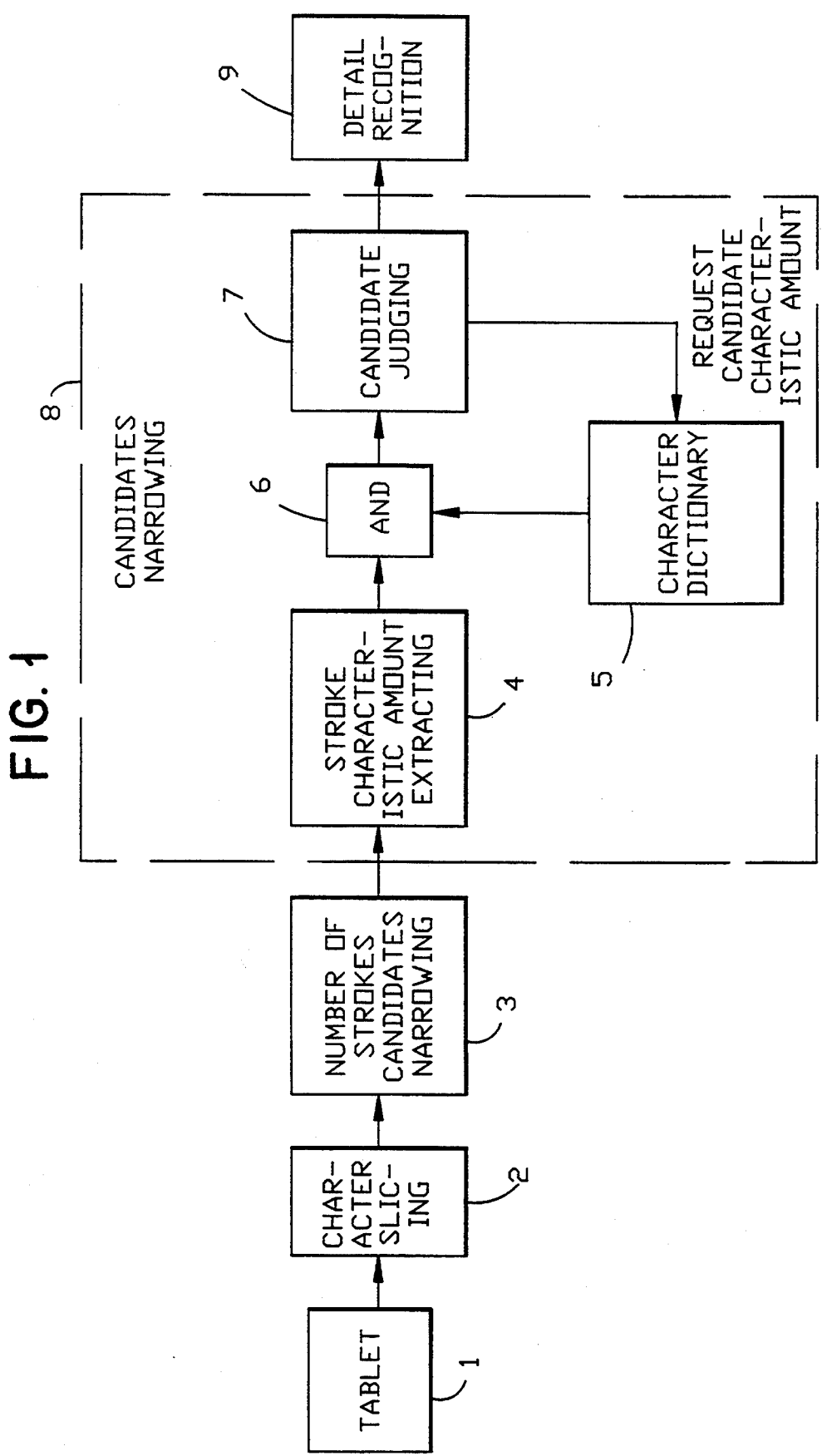
FIG. 1 is a block diagram showing an embodiment of this invention.

FIG. 1 shows this embodiment as a whole. In FIG. 1, handwritten characters are input from tablet 1 and supplied to character slicing means 2, where they are sliced as input character data. The input character data are supplied to number of strokes candidates narrowing means, 3, where candidate characters are narrowed down by number of strokes. The input character data are further supplied to candidates narrowing means 8, which is directly related to this invention, along with their candidate characters. Candidate narrowing means 8 consists of stroke characteristic amount extracting means 4, character dictionary means 5, AND means 6 and candidate judging means 7. In candidate narrowing means 8, the stroke characteristic amount extracted from the input character data in stroke characteristic amount extracting means 4 and the stroke characteristic amount of candidate characters stored in character dictionary 5 are ANDed by AND means 6 for each stroke. The result of the AND operation is supplied to candidate judging means 7, where if the result is zero for more than a certain number of strokes, the particular candidate character is determined to be less probable and dropped from the candidates. Candidate judging means 7 repeatedly requests character dictionary 5 for the stroke characteristic amount of the next candidate character and judges all the candidate characters supplied from number of strokes candidates narrowing means 3. The candidate characters narrowed down in this way and the input character data are discriminated in detail recognition means 9, for instance, by pattern matching, and the recognition result is output.

Incidentally, number of strokes candidates narrowing means 3 is basically the same as the conventional means, and when the number of strokes falls in the range of Number of Strokes of Dictionary Character K (K can be 1, for instance), the dictionary character is judged to be a candidate character. In this embodiment, however, the number of strokes of a dictionary character is not decided from the information in a regular Chinese character dictionary, but is decided from the stroke distribution of actual sample characters. For instance, the average number of strokes or the number of most frequent strokes is used. Due to this, the narrowing of candidates by number of strokes becomes more appropriate for handwritten characters, and thus the narrowing can be accurately performed.

Of course, information from a Chinese character dictionary may be used, although the accuracy will become a little lower.

Extraction of stroke characteristic amount, creation of a dictionary and judgment of candidates are now described in more detail for each item.

(Extraction of Stroke Characteristic Amount)

As the characteristic amount, any amount related to strokes such as center of gravity, direction, circumscribed rectangle and number of strokes can be used singly or in combination. Here, a description is given of the case in which center of gravity is used as characteristic amount.

Figures 2, 3, 4:
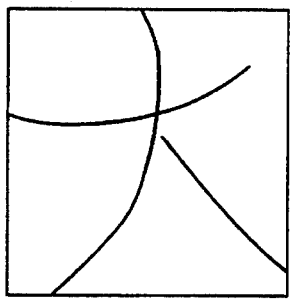
FIG. 2 is diagram showing normalization of input character data in the stroke characteristic amount extracting means of FIG. 1.
FIG. 3 is a diagram showing the quantization areas for center of gravity of a stroke in the stroke characteristic amount extracting means of FIG. 1.
FIG. 4 is a diagram showing expressions of the characteristic amount of center of gravity of a stroke in the stroke characteristic amount extracting means of FIG. 1.

First, the input character data is normalized according to its circumscribed rectangle, as in FIG. 2. Then, the center of gravity (X, Y) of each stroke in the input character data is calculated using the average of the point sequences (Xi, Yi) constituting the particular stroke and as

- Mathematical expression 1 -

$$X = \sum_{i=1}^{K} Xi/K, \ Y = \sum_{i=1}^{K} Yi/K \ (K: \text{number of points})$$

Furthermore, the two area numbers in which the center of gravity (X, Y) exists are obtained from FIG. 3, and the characteristic amount of a stroke is expressed by 1's set respectively in the bit positions corresponding to the area numbers in a single word, as shown in FIG. 4. FIGS. 3 and 4 show an example in which one word consists of 16 bits. FIG. 4 is an example of the second stroke of one sample of the character shown in FIG. 2. In addition, by providing two quantization areas as in FIG. 3, the effect of quantizing error is decreased. When another characteristic amount such as direction or circumscribed rectangle of a stroke is used, it is similarly quantized into 16 stages. Of course the number of bits in a word may be set to a value other than 16. Thus, when the number of strokes of the input character data is S, the stroke characteristic amount is expressed by a sequence of S words. If N characteristic amounts are combined, the individual characteristic amounts are independently expressed in S words, respectively, and these are expressed in a total of NS words. Of course, if characteristic amount words of N classes are connected in one word, the number of bits in the word increases accordingly, but one dictionary character can be expressed by S words.

(Creation of Dictionary)

The stroke characteristic amounts of handwritten character samples are stored in the dictionary. Here, a description is given of a method for creating one dictionary character for one character category. First, handwritten character samples that include variations in number of strokes and stroke order are collected for the character to be recognized, and the characteristic amounts of all the samples are extracted by extraction of the above-mentioned stroke characteristic amounts. Then, for the samples of the same character category, the stroke characteristic amounts of a stroke of the same order are gathered into one word by an OR operation, as shown in FIG. 5. FIG. 5 is an example of the second stroke of the character shown in FIG. 2. If the maximum number of strokes of the samples is assumed to be M, the dictionary character for this character category is created by M words. The M words created at this time would include the characteristic amounts of all the samples of this character category with no loss.

To prepare a plurality of dictionary characters for one character category, for instance, if the samples are classified beforehand by number of strokes, as many dictionary characters as the number of classes can be made.

The above described creation of a dictionary can be processed by software alone on a personal computer without requiring human intervention.

(Judgment of Candidates)

Judgment of candidates in AND means 6 and candidate judging means 7 of FIG. 1 is described with reference to FIG. 6. Here, a description is given of judgment of one character of the candidate characters supplied from number of strokes narrowing means 3.

One of the candidate characters is taken out in step S1, and the stroke characteristic amounts of the particular character are obtained from character dictionary means 5. Hereinafter, judgment of the candidate is performed through comparison of the stroke characteristic amounts of the candidate and the input character data. In step S2, E (which holds the number of strokes for which the result of the AND operation is zero) is initialized to zero. Also, T (which holds the sequence of the strokes to be compared) is initialized to one. In step S3, if comparison of all the strokes has ended (yes), the process goes to step S9 to end with the candidates that remain without being dropped. Otherwise (no) the process goes to step S4 to continue with comparison. In step S3, since the input character data and the candidate character may differ in number of strokes, comparison is made as many times as the lesser number of strokes. In step S4, the characteristic amounts of the input character data and candidate character are ANDed in one word for one stroke. If N characteristic amounts are used in combination, there is an AND operation of N words. In step S5, if the result is zero (yes), the process flows to step S6 to increment E by one, and if it is not zero (no), the process flows to step S10 to compare the next stroke. In step S7, if the number of strokes E for which the result of the AND operation is zero exceeds a threshold (yes), the process goes to step S8 to drop the particular character from the candidates and to terminate. Otherwise (no) the process goes to step S10 to compare the next stroke. In step S10, T is incremented by one for comparison of the next stroke.

Incidentally, the threshold value for judgment through comparison with E is set to zero if a sufficient number of handwritten character samples have been collected. The reason for this is that, since a dictionary character holds all the characteristic amounts in the samples, if the collected samples fully include all variation in number of strokes and stroke order, any variation in number of strokes and stroke order of unknown input character data can be covered, and thus if the result of even one stroke becomes zero, the probability of the input character being a candidate character for it becomes zero. If sufficient handwritten character samples cannot be collected, a threshold value of one or greater is set through experimentation.

In this embodiment, character slicing means 2, number of strokes candidates narrowing means 3, stroke characteristic extracting means 4, character dictionary means 5, AND means 6, candidate judging means 7 and detail discriminating means 9 are implemented by software on a personal computer.

Although reference has been made only to the portion concerning character recognition in the above embodiment, it is possible to construct a data processing unit including such a character recognition means. In this case, it is possible that a tablet can implement both input and display output functions. The recognition result is displayed on the tablet. Candidates other than the primary ones may be displayed so that the operator can make corrections.

As described above, in accordance with this invention, high-speed, high-precision and stable narrowing of candidate characters can be performed for input handwritten characters which include variation in number of strokes and stroke order, by simple processing of a small amount of operations.

By experiment, it was found that, if the center of gravity, direction, and circumscribed rectangle of a stroke are combined as the characteristic amount, the narrowing rate of candidates was high for kanji, which require a particularly high rate, and the error rate was low for kanji, hiragana, katakana and alphanumeric. This indicates that this invention is effective in a system for recognition that includes various types of characters.

In addition, since this invention can automatically create a dictionary for the narrowing process from a collection of handwritten character samples without requiring human intervention, it is efficient and the quality of the whole dictionary can be uniformly maintained. If some noise or incorrect characters are included in the collected samples, they will not cause the input character to be dropped from the candidates, and thus they neither produce a narrowing error nor have a large effect on the narrowing rate. Moreover, maintenance of the dictionary, such as for addition of character types, is also easy.

Having thus described our inveniton, what we claim as new, and desire to secure by Letters Patent is:

1. An online handwritten character recognition system which performs recognition of handwritten characters on the basis of locus information which is electronically input through a position input device, the online handwritten character recognition system comprising:

an electronic digitizing tablet, means for extracting a characteristic amount from each stroke of an input character on the digitizing tablet, and for converting each characteristic amount extracted from each stroke of an input characteristic into an input character amount word which is of a predetermined bit width and has a binary value of 1 only in one or more bit positions corresponding to selected values of said characteristic amount, a dictionary coupled to the means for extracting, the dictionary comprising means for storing, for each stroke of a dictionary character, a reference characteristic amount word which is of the same bit width as said input characteristic amount word and has binary values of 1 in one or more bit positions corresponding to selected values of the characteristic amount, an AND circuit coupled to the means for storing and the means for extracting and converting, the AND circuit comprising means for ANDing bit-by-bit, for each stroke of said input character, the input characteristic amount word of said stroke and the reference characteristic amount word of the corresponding stroke of the dictionary character, and thereafter determining if the results of the AND operation for all the bits is zero, means for accumulating the results of the zero-determining operations for each stroke for each dictionary character, and determining according to the accumulated value whether said dictionary character is a candidate for said input character, and means for performing detailed recognition of said input character with respect to a character which has been determined to be a candidate for said input character.

2. A handwritten character recognition system as set forth in claim 1 wherein said characteristic amount is the center of gravity of a stroke.

3. A handwritten character recognition system as set forth in claim 2 further comprising a preprocessing portion for selecting a candidate according to the number of stroke in an input character.

4. A handwritten character recognition system as set forth in claim 3 wherein said reference characteristic amount word is constructed by ORing the input characteristic amount words obtained from sample characteristic amounts.

5. A data processing system with a handwritten character input function comprising:

an electronic digitizing tablet including a position input means for electronically inputting the locus of a character, a means for extracting the characteristic amount of each stroke of the input character which has been input through said position input means, a means for converting an electrical signal representing said extracted characteristic amount into an electrical signal representing an input characteristic amount word which is of a predetermined bit width and has binary value of 1 only in one or more bit positions corresponding to selected values of said characteristic amount, a means for storing, for each stroke of a dictionary character, an electrical signal representing a reference characteristic amount word which is of the same bit width as said characteristic amount word and has a binary value of 1 in one or more bit positions corresponding to selected values of the characteristic amount, an AND circuit, the AND circuit comprising a means for ANDing bit-by-bit, for each stroke of said input character, the electrical signals representing the input characteristic amount word of said stroke and the reference characteristic amount word of the corresponding stroke of the dictionary character, and thereafter determining if the results of the AND operation for all the bits is zero, a means for accumulating for each character the results of the zero-determining operations for each stroke, and determining according to the accumulated value whether said dictionary character is a candidate for said input character, a means for performing detailed recognition of said input character with respect to a character which has been determined to be a candidate for said input character, and a display, the display including means for displaying the character which has been determined by said detailed recognition.

* * * * *